Figure 1:
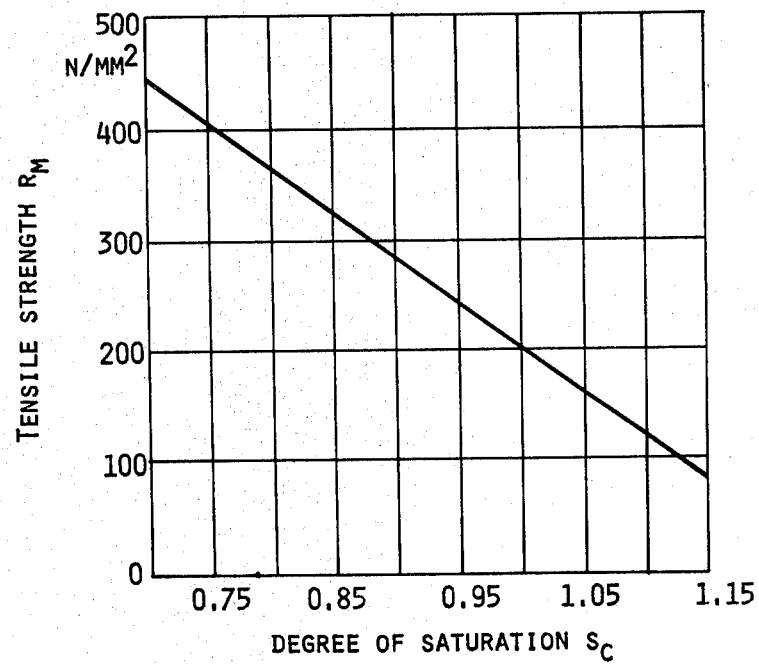

United States Patent [19]

Doliwa

[11] 4,398,946
[45] Aug. 16, 1983

[54] METHOD OF HOMOGENIZING CAST IRON MELTS AND COMPACTS FOR THE CARRYING OUT THEREOF

[75] Inventor: Heinz-Ulrich Doliwa, Friedberg, Fed. Rep. of Germany

[73] Assignee: Werner Kessl Giessereibedarf GmbH, Bärnwinkel, Fed. Rep. of Germany

[21] Appl. No.: 298,536

[22] Filed: Sep. 2, 1981

[30] Foreign Application Priority Data

Sep. 3, 1980 [DE] Fed. Rep. of Germany ....... 3033194

[51] Int. Cl.³ .............................................. C21C 7/00
[52] U.S. Cl. .......................................... 75/30; 75/53; 75/257
[58] Field of Search .......................... 75/30, 53, 41, 257

[56] References Cited

U.S. PATENT DOCUMENTS 3,567,432  3/1971  Wardell ................................. 75/257
4,022,613  5/1977  Haley ..................................... 75/53
4,292,075  9/1981  Wolfsgruber ........................... 75/53

Primary Examiner—P. D. Rosenberg
Attorney, Agent, or Firm—Gordon W. Hueschen

[57] ABSTRACT

A method of producing homogeneous cast-iron melts from a heterogeneous charge containing a proportion of steel scrap of up to very high amount as well as other ordinary charge components, such as pig iron, broken castings, recycle material and furnace additives, characterized by the fact that by the addition of compacts of silicon carbide or other alloying substances and/or ordinary charge components containing slag-forming admixtures from the ternary system 8–18% CaO–10–40% $SiO_2$–2–16% $Al_2O_3$ which contain additions of hydrocarbon and/or hydrocarbon-nitrogen compounds, a reductive furnace atmosphere and a limiting of suboxide-containing primary slags, a practically loss-free carburization and silicification as well as a favorable condition of nucleation of the homogenized melt is brought about, as well as compacts for carrying out the said method, are disclosed.

4 Claims, 2 Drawing Figures

RELATIONSHIP BETWEEN TENSILE STRENGTH $R_M$ AND DEGREE OF SATURATION $S_C$ IN ACCORDANCE WITH THE EQUATION $R_M = 1000 - 800\, S_C$

AVERAGE CARBON OFFERING FROM METALLIC CHARGE
(OPERATING NOMOGRAPH)

METHOD OF HOMOGENIZING CAST IRON MELTS AND COMPACTS FOR THE CARRYING OUT THEREOF

A high-quality cast iron of diversified use must be capable of being machined well even when it is of higher strength. For this it is necessary that it have a fine-grain structure, as can be detected by a large number of eutectic cells and that the graphite of A type be uniformly distributed. The melt must therefore be of a suitable composition, predominantly with respect to carbon and silicon, and for quality castings phosphorus and sulfur should be as low as possible. The characterization of the chemical composition which is customarily used in practice is the degree of saturation $S_c$ in accordance with the formula $$S_c = \frac{\% C}{4.3 - \frac{1}{3}(Si + P)} \quad (1)$$

Referred to the tensile test on a 30 mm test bar the degree of saturation is related as follows to the mechanical physical properties:

$$(R_m)_{theor.} = 1000 - 800 \cdot S_c \frac{N}{mm^2} \quad (2)$$

and $$RH = \frac{HB \text{ measured}}{100 + 4.3} \quad (3)$$

e.g. meas.

Insofar as cast iron melts are produced in cupola furnaces, there is an increasing trend, not only for economic reasons but predominantly also for metallurgical reasons, to use high proportions of steel scrap (50% and more) in the charge. Larger additions of steel scrap require an enriching of the charge with carbon and silicon substances in order that the required degree of saturation can be obtained.

There have proven satisfactory for this purpose shaped compacts having a base of silicon carbide in which, in accordance with West German Pat. No. 15 83 262.9-24, added, accompanying elements see to it that the compacts pass into the melting zone without substantial loss and that the slag which is formed there from the accompanying elements creates reductive conditions.

With very high proportions of steel scrap of about 80 to 90% in the charge, primary slags rich in FeO are formed, depending on the degree of rust of the scrap. In order to limit their influence, SiC compacts containing 6% graphite and more are produced (see West German Provisional Patent AS No. 27 27 896).

For the designer, the tensile strength is an important yardstick with respect to the load-bearing capacity of a cast iron, while the hardness gives information as to the machineability of the material. In cast iron materials the hardness is determined essentially by the nature and quantity of the precipitated graphite. The state of nucleation of the melt is controlling for the precipitation and development of the graphite. A large number of nuclei lead to numerous crystallization centers and thus to a fine-grain structure, togther with little branched graphite, for instance of type A3-4. When considering the graphitization process, the cooling conditions of the melt in the mold must not be disregarded. Thin-walled castings provide the carbon only with a small amount of time to precipitate as graphite from the compound $Fe_3C$. In order to accelerate the graphitization, the melts are therefore as a rule seeded with graphite-forming substances while still in the ladle or in the mold. The amount for seeding agents needed increases when the melt removed from the furnace or forehearth is poor in nuclei. Higher additions of seeding agent, however, are known from experience to have a detrimental effect, since the formation of shrinkage cavities and the number of oxide inclusions are increased thereby. Therefore a high state of nucleation of the base iron is always desired. Considerable differences in the hardness of thinner and thicker cross-sections of a casting are detrimental to good machining results and in many cases also are undesired due to the difference in wear upon abrasive machining which results therefrom.

An effect which promotes the graphitization and thus a reduction in hardness as well as the tendency towards the formation of cementite (chill depth) is obtained by carburization. It is difficult to introduce large quantities of carbon into the melting zone of a shaft furnace in view of the oxidizing atmosphere which is generally present and the FeO-containing primary slag. Under such conditions graphite has proven to be the only suitable form of carbon (see West German Provisional Patent AS No. 27 27 8969. For this reason it has been attempted to blow carbon-containing substances such as light, medium or heavy oils and tar and other distillates into the melt zone of the furnace, solvents being added and/or special burners for natural or other gases being employed in order to avoid the clogging of the nozzles by coking products.

Thus West German Provisional Patent AS No. 23 29 772 of Jan. 19, 1978, for example describes a method of producing cast iron of predeterminable quality by melting heterogeneous starting material with correction additives in the form of chemical compounds which are introduced into the cupola furnace separate from the charge. Small amounts of ozone as well as substances which give off nitrogen and halogens (chlorine, fluorine) are continuously added to the cupola furnace through nozzles, in part together with solvents and carburizing substances. The additions and the amounts thereof are calculated as a function of carbon equivalent and liquidus temperature. This method is complicated in its calculation and requires special attachments on the cupola furnace (nozzles or burners) and expensive investments in order to comply with the environmental emissions laws.

In contrast thereto, the method of the present invention dispenses with any attempt to influence the iron within the melt zone from the outside and effects the equalizing of a heterogeneous charge by suitable additions which are themselves a part of the charge.

For this purpose for example hydrocarbon compounds, preferably anthracene, pyrene, carbazol and, as nitrogen provider, for instance phenylnaphthyl carbazol are admixed in compacts—produced in accordance with West German Patent No. 15 83 262.9-24 or West German Provisional Patent AS No. 27 27 896—of silicon carbide and/or other ordinary alloying agents and charge components.

The hydrocarbon and hydrocarbon-nitrogen compounds within a very short time produce a reductive atmosphere and a limiting of the suboxide-containing primary slags and thus a practically loss-free introduction of carbon and silicon from the silicon carbide and graphite contained in the compact. Carburization, silicification and an effective reduction slag constitute the prerequisites for the formation of a favorable state of nucleation and a homogeneous melt. This is true of hypoeutectic cast irons with flake graphite as well as eutectic and hypereutectic types and is also of great importance for the production of base melts for the production of cast iron containing spheroidal graphite.

The amounts of the said hydrocarbon and hydrocarbon-nitrogen compounds added depend on the proportion of steel scrap in the charge. With an increase in the amount of steel scrap the need for silicon in order to establish the required degree of saturation increases as does the need for carbon so that it is practical to provide the SiC compacts with a fixed addition of the said substances of homogenizing action. The effectiveness of the additions can be noted from the operating results set forth below.

1. Cold-blast furnace melts with 30% steel scrap in the charge; batch weight 750 kg; addition: 4 compacts

| Consecutive Number | Chemical Composition | | | | | | $R_m$ N/mm$^2$ | HB 2.5/187.5 | Relative hardness RH | Degree of Normality RG % |
|---|---|---|---|---|---|---|---|---|---|---|
| | C % | Si % | Mn % | P % | S % | $S_c$ % | | | | |
| 1 | 3.39 | 2.38 | 0.54 | 0.301 | 0.081 | 1.00 | 252 | 219/211 | 1.03 | 126 |
| 2 | 3.69 | 2.34 | 0.52 | 0.235 | 0.040 | 1.07 | 181 | 181/184 | 1.04 | 125 |

The following hardness values were determined by means of step wedges on the same melt:

| Step height in mm | Test Piece Number | |
|---|---|---|
| | 1 HB | 2 HS |
| 4.5 front tip | 252 | 211 |
| 4.5 center | 254 | 217 |
| 9.0 center | 247 | 212 |
| 13.5 center | 247 | 210 |
| total dispersion HB | 7 | 7 |

2. Step wedges (total length 240 mm) with step dimensions of 6×60 mm, 12×60 mm, 25×60 mm and 50×60 mm were cast with addition of 8–12 compacts (tensile strength of the iron $R_m$=334 N/mm$^2$) from a melt from a hot blast furnace containing 60% steel scrap. The dispersions from the edge zone to the center zone were 4 HB units in the 50 mm step, 5 HB units in the 25 mm step as well as in the 12 mm step and 8 HB units in the 6 mm step.

The method of the invention can also be carried out by using in the compacts, as alloying agents together with the hydrocarbon compounds of homogenizing action, also any other alloying components customary in iron charges such as ferrosilicon, calcium silicon, ferrochromium, ferromanganese, ferrophosphorus, iron or steel chips, lime, sand, etc.

In another embodiment of the method of the invention the compacts for the homogenizing of the melt contain merely naphthalene, anthracene, pyrene, carbozol, phenyl naphthyl carbazol, anthraquinone, natural resins and/or distillation products such as pitch or tar in solid or oily form, together for instance with pebbles and cement.

EXAMPLE 1

Desired strength $R_m$=250 N/mm$^2$. For this a value of $S_c$=0.93 is obtained from FIG. 1. C=3.4% is selected for the analysis. The charge has a proportion of steel scrap of 30%; batch weight: 500 kg.

Figure 2:
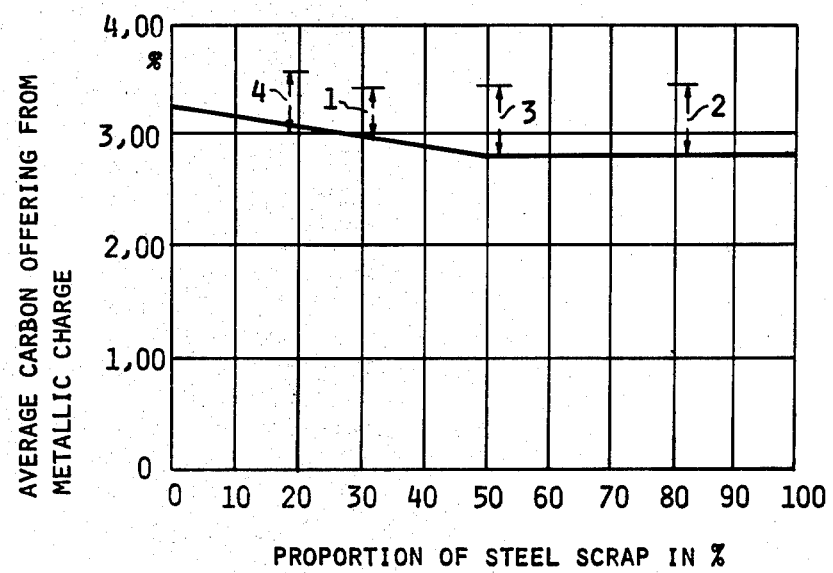

According to FIG. 2, the difference between the offer of carbon from the charge and the value 3.4% is about 0.49%, corresponding to a need for 2.4 kg C per batch. The carbon offering of one compact is 700 g. Thus three compacts per batch are required.

Recalculation of the silicon content gives:

| | |
|---|---|
| 70% charge components without steel (Si = 0.75%) | 1.225% Si |
| 3 compacts each containing 1 kg Si useful content | 0.600% Si |
| | 1.825% Si |

Accordingly: $S_c = \dfrac{3.4}{4.3 - \frac{1}{3}(1.8 + 0.2)} = 0.93$

EXAMPLE 2

Strength desired: $R_m$=300 N/mm$^2$. From FIG. 1 there is obtained a value of $S_c$=0.88. C is selected as 3.4%. Steel-scrap proportion 80%; batch weight: 650 kg. According to FIG. 2 the carbon difference is 0.72% or 4.68 kg/batch. This results in a need for 7 compacts per batch.

Silicon supply:

| | |
|---|---|
| 20% steel-free charge with 1.5% Si gives | 0.3% Si |
| 7 compacts each containing 1 kg Si useful content give | 1.1% Si |
| | 1.4% Si |

Accordingly: $S_c = \dfrac{3.4}{4.3 - \frac{1}{3}(1.4 + 0.1)} = 0.89$

EXAMPLE 3

For thin-wall castings a melt with $S_c$=1.00 and C=3.4% is prepared. Proportion of steel scrap: 50%; batch weight: 600 kg. Carbon requirement in accordance with FIG. 1: About 0.78% or 4.7 kg/batch. Thus 7 compacts per batch are required.

| | |
|---|---|
| 50% steel-free charge components with 2.4% Si give | 1.2% Si |
| 7 compacts each having 1 kg Si useful content give | 1.17% Si |
| | 2.37% Si |

Accordingly: $S_c = \dfrac{3.4}{4.3 - \frac{1}{3}(2.37 + 0.2)} = 0.99$

EXAMPLE 4

A melt with $S_c$=1.1 and C=3.6% is to be produced. Proportion of steel scrap 20%; batch weight 500 kg. Carbon requirement in accordance with FIG. 2: About 0.6% of 3.0 kg per batch. Thus 4 compacts per batch are required.

Silicon supply:

| | |
|---|---|
| 80% steel-free charge components containing 2.4% Si give | 1.92% Si |
| 4 compacts each of 1 kg Si useful content give | 0.80% Si |
| | 2.72% Si |

-continued

Accordingly: $S_c = \frac{3.6}{4.3 - \frac{1}{3}(2.7 + 0.1)} = 1.11$

FIG. 1: Relationship between tensile strength $R_m$ and degree of saturation $S_c$ in accordance with the equation $R_m = 1000 - 800 \cdot S_c$.

FIG. 2: Average carbon offering from metallic charge (Operating nomograph).

I claim:

1. A method of producing homogeneous cast-iron melts from a heterogeneous charge containing steel scrap, comprising the step of adding to the melt a compact comprising a component selected from (1) silicon carbide, (2) ferrosilicon, calcium silicon, ferrochromium, ferromanganese, ferrophosphorus, iron chips, or steel chips, and (3) a slag-forming admixture from the ternary system 8–18% CaO—10–40% $SiO_2$—2–16% $Al_2O_3$, which compact also contains a hydrocarbon or hydrocarbon-nitrogen compound selected from naphthalene, anthracene, pyrene, carbazol, phenylnaphthylcarbazol, and anthraquinone in an amount of 0.5 to 40% per compact.

2. The method of claim 1, wherein the hydrocarbon or hydrocarbon-nitrogen compound is provided in the form of a product selected from natural resins, pitch, and tar.

3. The method of claim 1 or 2, wherein the compact comprises component (2) together with a further component selected from lime and sand.

4. The method of any of claims 1, 2, and 3 wherein the compact comprises a component selected from components (1) and (2) as defined in claim 1.

* * * * *

UNITED STATES PATENT AND TRADEMARK OFFICE
CERTIFICATE OF CORRECTION

PATENT NO. : 4,398,946

DATED : August 16, 1983

INVENTOR(S) : Heinz-Ulrich Doliwa

It is certified that error appears in the above—identified patent and that said Letters Patent is hereby corrected as shown below:

Col. 1, line 45; delete the "," after "added"

Col. 3, line 15; place a -- , -- after "carbon"

Col. 3, lines 60 & 61; "carbozol" should read -- carbazol --

Signed and Sealed this

Twenty-ninth Day of November 1983

[SEAL]

Attest:

Attesting Officer

GERALD J. MOSSINGHOFF

Commissioner of Patents and Trademarks